US012481304B2

(12) United States Patent
Chen

(10) Patent No.: US 12,481,304 B2

(45) Date of Patent: Nov. 25, 2025

(54) BANDGAP CIRCUIT WITH ADAPTIVE START-UP DESIGN

(71) Applicant: MEDIATEK INC., Hsinchu (TW)

(72) Inventor: Chen-Ming Chen, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 267 days.

(21) Appl. No.: 18/318,866

(22) Filed: May 17, 2023

(65) Prior Publication Data

US 2024/0012440 A1 Jan. 11, 2024

Related U.S. Application Data

(60) Provisional application No. 63/367,655, filed on Jul. 5, 2022.

(51) Int. Cl.
*G05F 3/26* (2006.01)
*G05F 1/46* (2006.01)

(52) U.S. Cl.
CPC .............. *G05F 3/267* (2013.01); *G05F 1/468* (2013.01)

(58) Field of Classification Search
CPC ................................. G05F 1/468; G05F 3/267
See application file for complete search history.

(56) References Cited

U.S. PATENT DOCUMENTS 7,626,374 B2 12/2009 Haiplik
9,035,694 B2 * 5/2015 Choi ......................... G05F 3/30 327/539
10,061,336 B1 * 8/2018 Shor ......................... G05F 3/30
2008/0224682 A1 * 9/2008 Haiplik ..................... G05F 3/30 327/539
2011/0169561 A1 * 7/2011 Chu .......................... G05F 3/30 327/539
2018/0210480 A1 * 7/2018 Sone ....................... G05F 3/267
2019/0025868 A1 * 1/2019 Segarra ..................... G05F 3/30
2019/0129461 A1 * 5/2019 Sone ....................... G05F 3/267

FOREIGN PATENT DOCUMENTS

EP 0 895 147 B1 5/2002

OTHER PUBLICATIONS

Extended European Search Report dated Nov. 29, 2023, issued in application No. EP 23179601.2.
Anonymous; "Bandgap Voltage and Current Reference Designer;" Jan. 2007; pp. 1-3.

* cited by examiner

*Primary Examiner* — Jue Zhang
*Assistant Examiner* — Lakaisha Jackson
(74) *Attorney, Agent, or Firm* — McClure, Qualey & Rodack, LLP

(57) ABSTRACT

A bandgap circuit with adaptive start-up design is shown, which includes a bandgap core and a start-up circuit. The bandgap core uses paired bipolar transistors (BJTs) to eliminate temperature-sensitive factors and thereby generate a bandgap voltage that is independent of temperature variations. The start-up circuit couples an emitter terminal of a first BJT of the paired BJTs to a power line to start up the bandgap core. The start-up circuit includes a reference BJT that provides a threshold voltage as a reference for disconnecting the power line from the emitter terminal of the first BJT.

16 Claims, 3 Drawing Sheets

BANDGAP CIRCUIT WITH ADAPTIVE START-UP DESIGN

CROSS REFERENCE TO RELATED APPLICATIONS

This application claims the benefit of U.S. Provisional Application No. 63/367,655, filed Jul. 5, 2022, the entirety of which is incorporated by reference herein.

BACKGROUND OF THE INVENTION

Field of the Invention

The present invention relates to bandgap circuits.

Description of the Related Art

In integrated circuits, a bandgap voltage reference is required, which is a temperature independent voltage reference. The bandgap circuit produces a constant voltage regardless of power supply variations, temperature changes, or circuit loading from a device.

The start-up of the bandgap core is an important topic in this field.

BRIEF SUMMARY OF THE INVENTION

A bandgap circuit with adaptive start-up design is shown.

A bandgap circuit in accordance with an exemplary embodiment of the present invention includes a bandgap core and a start-up circuit. The bandgap core uses paired bipolar transistors (BJTs) to eliminate temperature-sensitive factors and thereby generate a bandgap voltage independent of temperature variations. The start-up circuit couples the emitter terminal of the first BJT of the paired BJTs to the power line to start up the bandgap core. The start-up circuit includes a reference BJT that provides the threshold voltage as a reference for disconnecting the power line from the emitter terminal of the first BJT.

In an exemplary embodiment, the reference bipolar transistor (BJT) is in a diode-connected form, just like the first BJT is. The start-up circuit further has a comparator, having a positive input terminal receiving a sensed voltage related to a sensed current sensed from the bandgap core, a negative input terminal coupled to the emitter terminal of the reference BJT, and an output terminal outputting the control signal to connect the emitter terminal of the first BJT to the power line or not.

In an exemplary embodiment, the start-up circuit further has a start-up control MOS, having a gate terminal coupled to the output terminal of the comparator, a source terminal coupled to the power line, and a drain terminal coupled to the emitter terminal of the first BJT.

In an exemplary embodiment, the start-up circuit further has a first resistor, coupling the emitter terminal of the reference BJT to the power line. The connection terminal between the first resistor and the reference BJT is coupled to the negative input terminal of the comparator.

In an exemplary embodiment, the start-up circuit further has a second resistor, coupled between the positive input terminal of the comparator and ground, and through which flows the sensed current.

In an exemplary embodiment, the start-up circuit further has a current mirror MOS, mirroring the current from the bandgap core to generate the sensed current that flows through the second resistor.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
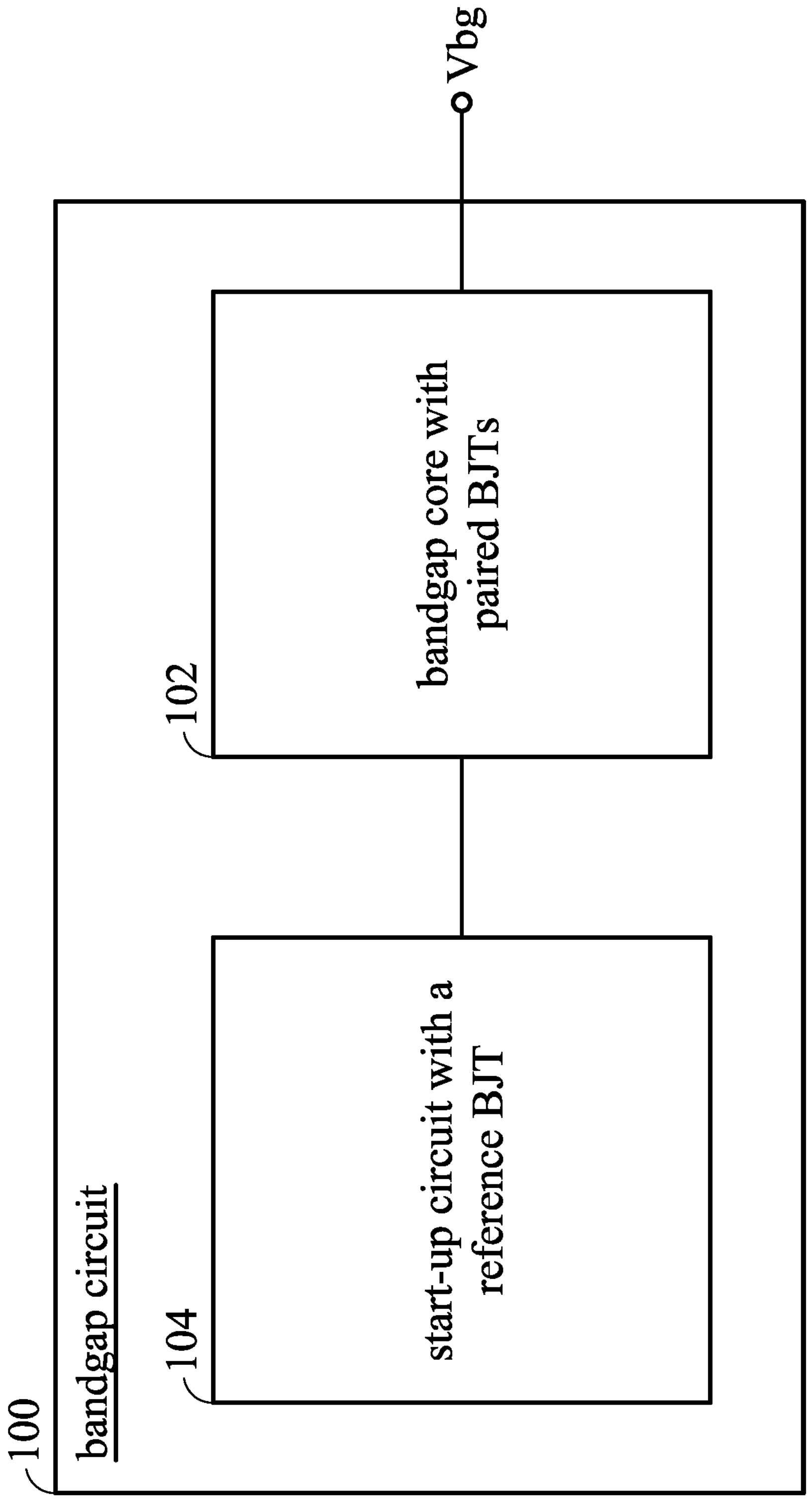
FIG. 1 is a block diagram depicting a bandgap circuit 100 in accordance with an exemplary embodiment of the present invention.

FIG. 1 is a block diagram depicting a bandgap circuit 100 in accordance with an exemplary embodiment of the present invention.

The bandgap circuit 100 includes a bandgap core 102 and a start-up circuit 104. The bandgap core 102 uses paired bipolar transistors (BJTs) to eliminate temperature-sensitive factors and thereby generate a bandgap voltage Vbg that is independent of temperature variations. The start-up circuit 104 couples the emitter terminal of the first BJT of the paired BJTs of the bandgap core 102 to the power line to start up the bandgap core 102. Especially, the start-up circuit 104 includes a reference BJT that provides the threshold voltage as a reference for disconnecting the power line from the emitter terminal of the first BJT.

The threshold voltage of the reference BJT within the start-up circuit 104 can faithfully show the turn-on threshold of the first BJT of the bandgap core 102. The start-up circuit 104, therefore, would not disconnect the power line from the emitter terminal of the first BJT of the bandgap core 102 too early. The emitter terminal of the first BJT of the bandgap core 102 is kept coupled to the power line until being really turned on. The bandgap circuit 100 will not be trapped in a deadlock region.

In conventional techniques, a start-up circuit uses a threshold voltage of an inverter as a reference for disconnecting the power line from the emitter terminal of the first BJT of the bandgap core. The conventional start-up circuit may disconnect the power line from the emitter terminal of the first BJT of the bandgap core too early. The conventional bandgap circuit may be trapped in a deadlock region.

Figure 2:
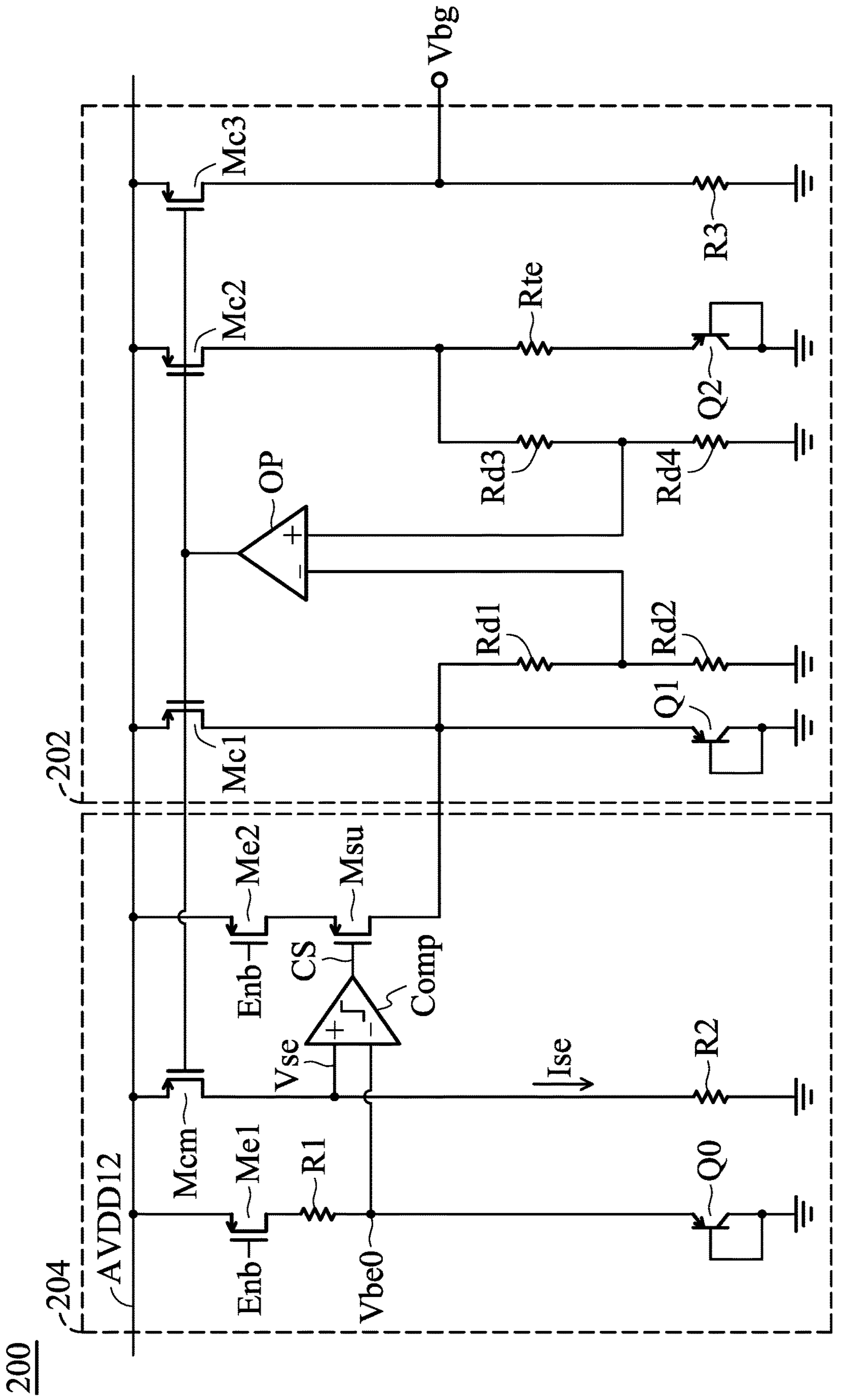
FIG. 2 depicts a bandgap circuit 200 with a low-voltage bandgap core 202 in accordance with an exemplary embodiment of the present invention.

FIG. 2 depicts a bandgap circuit 200 in accordance with an exemplary embodiment of the present invention.

The bandgap circuit 200 includes a bandgap core 202 and a start-up circuit 204. The bandgap core 202 uses paired BJTs Q1 and Q2 to eliminate temperature-sensitive factors (e.g., eliminated from a voltage difference of a temperature-sensitive factor elimination resistor Rte) and thereby generate a bandgap voltage Vbg independent of temperature variations. The start-up circuit 204 couples the emitter terminal of the first BJT Q1 to the power line AVDD12 to start up the bandgap core 202. The start-up circuit 204 includes a reference BJT Q0 that provides the threshold voltage Vbe0 as a reference for disconnecting the power line AVDD12 from the emitter terminal of the first BJT Q1. As shown, the reference BJT Q0 is in a diode-connected form, just like the first BJT Q1 is.

The start-up circuit 204 further has a comparator Comp, which has a positive input terminal '+' receiving a sensed voltage Vse related to a sensed current Ise sensed from the bandgap core 202, a negative input terminal '−' coupled to the emitter terminal of the reference BJT Q0 to receive the base-emitter voltage Vbe0 of the reference BJT Q0, and the output terminal outputting the control signal CS to connect the emitter terminal of the first BJT Q1 to the power line AVDD12 or not.

The start-up circuit 204 further has a start-up control metal-oxide-semiconductor field-effect (MOS) transistor Msm, which is a PMOS, and has a gate terminal coupled to the output terminal of the comparator Comp to be controlled by the control signal CS, a source terminal coupled to the power line AVDD12, and a drain terminal coupled to the emitter terminal of the first BJT Q1.

The start-up circuit 204 further has a first resistor R1, coupling the emitter terminal of the reference BJT Q0 to the power line AVDD12. The start-up circuit 204 further has a second resistor R2, coupled between the positive input terminal '+' of the comparator Comp and ground, and through which flows the sensed current Ise to generate the sensed voltage Vse. The start-up circuit 204 further has a current mirror MOS Mcm, mirroring the current of the bandgap core 202 to generate the sensed current Ise that flows through the second resistor R2.

The start-up circuit 204 further has optional enable MOSs Me1 and Me2. The first enable MOS Me1 is coupled between the power line AVDD12 and the first resistor R1, and controlled by the enable signal Enb of the start-up circuit 204. The second enable MOS Me2 is coupled between the power line AVDD12 and the source terminal of the start-up control MOS Msu, and controlled by the enable signal Enb of the start-up circuit 204.

In such a circuit architecture, the enabled start-up circuit 204 drains power to the bandgap core 202 till the bandgap core 202 really starts up. When the sensed voltage Vse is greater than a BJT's base-emitter voltage (Vbe0), it means that the first BJT Q1 within the bandgap core 202 really works, and the bandgap core 202 successfully generates the bandgap voltage Vbg. In is guaranteed that the start-up 204 will not disconnect the power line AVDD12 from the emitter terminal of the first BJT Q1 too early.

FIG. 2 shows a low-voltage design, the power line AVDD12 is biased at 1.2V, and the bandgap core 202 uses a single operational amplifier Op. The bandgap core 202 uses two voltage divider to shift the signals to the proper levels to input the single operational amplifier Op of the low-voltage design. The first voltage divider has a first voltage-divided resistor Rd1 coupled between the emitter terminal of the first BJT Q1 and a negative input terminal '−' of the single operational amplifier Op, and a second voltage-divided resistor Rd2 coupled between the negative input terminal '−' of the single operational amplifier Op and ground. The second voltage divider has a third voltage-divided resistor Rd3 coupled between the first end of the temperature-sensitive factor elimination resistor Rte and a positive input terminal '+' of the single operational amplifier Op, and a fourth voltage-divided resistor Vd4 coupled between the positive input terminal '+' of the single operational amplifier Op and the ground.

The bandgap core 202 further has a first current MOS Mc1 and a second current MOS Mc2. The first current MOS Mc1 has a source terminal coupled to the power line AVDD12, and a drain terminal coupled to the connection terminal between the emitter terminal of the first BJT Q1 and the first voltage-divided resistor Rd1. The second current MOS Mc2 has a source terminal coupled to the power line AVDD12, and a drain terminal coupled to the connection terminal between the first end of the temperature-sensitive factor elimination resistor Rte and the third voltage-divided resistor Rd3. The gate terminal of the first current MOS Mc1 is connected to the gate terminal of the second current MOS Mc2. The output terminal of the single operational amplifier Op is coupled to the gate terminals of the first current MOS Mc1 and the second current MOS Mc2.

The bandgap core 202 further has a third current MOS Mc3 and a third resistor R3. The third current MOS Mc3 has a source terminal coupled to the power line AVDD12, and a gate terminal coupled to the gate terminals of the first current MOS Mc and the second current MOS Mc2. The third resistor R3 couples the drain terminal of the third current MOS Mc3 to the ground. The connection terminal between the drain terminal of the third current MOS Mc3 and the third resistor R3 is coupled to the output terminal (Vbg) of the bandgap circuit 200.

When the bandgap core 202 has not been turned on, the enabled start-up circuit 204 cannot sense any current (Ise is 0), and the sensed voltage Vse is lower than the base-emitter voltage Vbe0 of the reference BJT Q0, and the comparator Comp outputs a low control signal CS to turn on the start-up control MOS Msu, and thereby power from the power line AVDD12 is enforced into the bandgap core 202. The voltage level at the negative input terminal '−' of the single operational amplifier Op increases, so that the gate terminals of the current MOSs Mc1-Mc3 is pulled down, the bandgap core 202 starts to work. The sensed voltage Vse increases. When the sensed voltage Vse is greater than the BJT threshold voltage (Vbe0), it means that the emitter voltage of the first BJT Q1 is greater enough to turn on the first BJT Q1. The comparator Comp disconnects the start-up circuit 204 from the bandgap core 202. In comparison with a conventional start-up circuit without the reference BJT Q0, the start-up circuit 204 will not break the connection between the power line AVDD12 and the bandgap core 202 until the emitter voltage of the first BJT Q1 is really greater than the BJT's threshold voltage and the first BJT Q1 is turned on. Based on the reference BJT Q0, the start-up circuit 204 is adaptive to various PVT corners.

Figure 3:
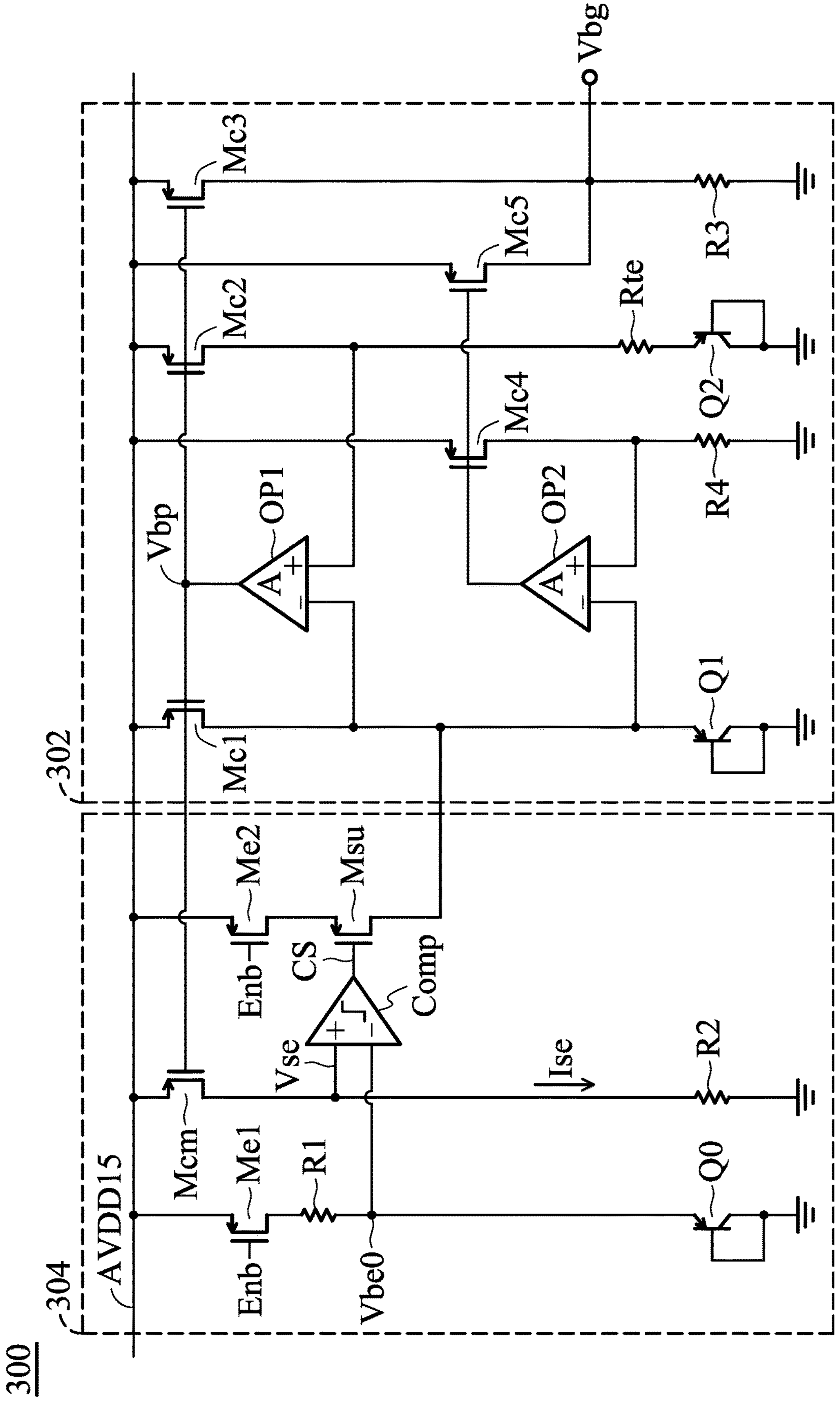
FIG. 3 depicts a bandgap circuit 300 with a high-voltage bandgap core 302 in accordance with an exemplary embodiment of the present invention.

FIG. 3 depicts a bandgap circuit 300 in accordance with another exemplary embodiment of the present invention. The bandgap circuit 300 includes a bandgap core 302 and a start-up circuit 304. The start-up circuit 304 has the same structure as the start-up circuit 204 of FIG. 2. In comparison with FIG. 2, the bandgap circuit 300 is a high-voltage design. The power line AVDD15 is biased at 1.5V. The bandgap core 302 uses two cascaded operational amplifiers Op1 and Op2.

The first operational amplifier Op1 has a negative input terminal '−' coupled to the emitter terminal of the first BJT Q1, and a positive input terminal '+' coupled to the first end of the temperature-sensitive factor elimination resistor Rte. The bandgap core 302 further has a first current MOS Mc1 and a second current MOS Mc2. The first current MOS Mc1 has a source terminal coupled to the power line AVDD15, and a drain terminal coupled to the emitter terminal of the first BJT Q1. The second current MOS Mc2 has a source terminal coupled to the power line AVDD15, and a drain terminal coupled to the first end of the temperature-sensitive factor elimination resistor Rte. The gate terminal of the first current MOS Mc1 is connected to the gate terminal of the second current MOS Mc2. The output terminal of the first operational amplifier Op1 is coupled to the gate terminals of the first current MOS Mc1 and the second current MOS Mc2.

The second operational amplifier Op2 has a negative input terminal '−' coupled to the emitter terminal of the first BJT Q1. The positive input terminal '+' of the second operational amplifier Op is coupled to the ground through a fourth resistor R4. The bandgap core 302 further has a fourth current MOS Mc4 and a fifth current MOS Mc5. The fourth current MOS Mc4 has a source terminal coupled to the power line AVDD15, a gate terminal coupled to the output terminal of the second operational amplifier Op2, and a drain terminal coupled to the ground through the fourth resistor R4. The fifth current MOS Mc5 has a source terminal coupled to the power line AVDD15, a gate terminal coupled to the gate terminal of the fourth current MOS Mc4, and a drain terminal coupled to the ground through the third resistor R3.

For such a high-voltage bandgap core 302, the proposed start-up circuit 304 is still adaptive to the BJT threshold of the first BJT Q1 of the bandgap core 302.

Any start-up circuit with the reference BJT Q0 should be considered within the scope of the present invention. The bandgap core driven by the proposed start-up circuit may have many variations.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A bandgap circuit with adaptive start-up design, comprising:

a bandgap core, using paired bipolar transistors to eliminate temperature-sensitive factors and thereby generate a bandgap voltage independent of temperature variations; and a start-up circuit, coupling an emitter terminal of a first bipolar transistor of the paired bipolar transistors to a power line to start up the bandgap core, wherein the start-up circuit includes:

a reference bipolar transistor that provides a threshold voltage as a reference for disconnecting the power line from the emitter terminal of the first bipolar transistor;

a start-up control MOS, having a source terminal coupled to the power line, and a drain terminal coupled to the emitter terminal of the first bipolar transistor;

a comparator, having a positive input terminal receiving a sensed voltage, a negative input terminal receiving the threshold voltage, and an output terminal coupled to a gate terminal of the start-up control MOS, wherein, rather than directly using the bandgap voltage as the sensed voltage, the sensed voltage is generated from a sensed current that is mirrored from the bandgap core generating the bandgap voltage.

2. The bandgap circuit with adaptive start-up design as claimed in claim 1, wherein:

the reference bipolar transistor is in a diode-connected form, the same as the first bipolar transistor.

3. The bandgap circuit with adaptive start-up design as claimed in claim 1, wherein the start-up circuit further comprises:

a first resistor, coupling the emitter terminal of the reference bipolar transistor to the power line, wherein a connection terminal between the first resistor and the reference bipolar transistor is coupled to the negative input terminal of the comparator.

4. The bandgap circuit with adaptive start-up design as claimed in claim 3, wherein the start-up circuit further comprises:

a second resistor, coupled between the positive input terminal of the comparator and ground, and through which flows the sensed current.

5. The bandgap circuit with adaptive start-up design as claimed in claim 4, wherein the start-up circuit further comprises:

a current mirror MOS, mirroring current of the bandgap core to generate the sensed current that flows through the second resistor.

6. The bandgap circuit with adaptive start-up design as claimed in claim 5, wherein the start-up circuit further comprises:

a first enable MOS, coupled between the power line and the first resistor, and controlled by an enable signal of the start-up circuit; and a second enable MOS, coupled between the power line and the source terminal of the start-up control MOS, and controlled by the enable signal of the start-up circuit.

7. The bandgap circuit with adaptive start-up design as claimed in claim 1, wherein the bandgap core further comprises:

a second bipolar transistor, in the diode connected form, and paired with the first bipolar transistor; and a temperature-sensitive factor elimination resistor, with a first end biased based on a base-emitter voltage of the first bipolar transistor, and a second end biased by a base-emitter voltage of the second bipolar transistor.

8. The bandgap circuit with adaptive start-up design as claimed in claim 7, wherein the bandgap core further comprises:

a single operational amplifier;

a first voltage divider, having a first voltage-divided resistor coupled between the emitter terminal of the first bipolar transistor and a negative input terminal of the single operational amplifier, and a second voltage-divided resistor coupled between the negative input terminal of the single operational amplifier and ground;

a second voltage divider, having a third voltage-divided resistor coupled between the first end of the temperature-sensitive factor elimination resistor and a positive input terminal of the single operational amplifier, and a fourth voltage-divided resistor coupled between the positive input terminal of the single operational amplifier and the ground.

9. The bandgap circuit with adaptive start-up design as claimed in claim 8, wherein the bandgap core further comprises:

a first current MOS, having a source terminal coupled to the power line, and a drain terminal coupled to a connection terminal between the emitter terminal of the first bipolar transistor and the first voltage-divided resistor; and a second current MOS, having a source terminal coupled to the power line, and a drain terminal coupled to a connection terminal between the first end of the temperature-sensitive factor elimination resistor and the third voltage-divided resistor;

wherein:

a gate terminal of the first current MOS is connected to a gate terminal of the second current MOS; and an output terminal of the single operational amplifier is coupled to the gate terminals of the first current MOS and the second current MOS.

10. The bandgap circuit with adaptive start-up design as claimed in claim 9, wherein the bandgap core further comprises:

a third current MOS, having a source terminal coupled to the power line, and a gate terminal coupled to the gate terminals of the first current MOS and the second current MOS; and a third resistor, coupling a drain terminal of the third current MOS to the ground;

wherein a connection terminal between the drain terminal of the third current MOS and the third resistor is coupled to an output terminal of the bandgap circuit that provides the bandgap voltage.

11. The bandgap circuit with adaptive start-up design as claimed in claim 10, wherein the power line is biased at 1.2V.

12. The bandgap circuit with adaptive start-up design as claimed in claim 7, wherein the bandgap core further comprises:

a first operational amplifier, having a negative input terminal coupled to the emitter terminal of the first bipolar transistor, and a positive input terminal coupled to the first end of the temperature-sensitive factor elimination resistor.

13. The bandgap circuit with adaptive start-up design as claimed in claim 12, wherein the bandgap core further comprises:

a first current MOS, having a source terminal coupled to the power line, and a drain terminal coupled to the emitter terminal of the first bipolar transistor; and a second current MOS, having a source terminal coupled to the power line, and a drain terminal coupled to the first end of the temperature-sensitive factor elimination resistor;

wherein:

a gate terminal of the first current MOS is connected to a gate terminal of the second current MOS; and an output terminal of the first operational amplifier is coupled to the gate terminals of the first current MOS and the second current MOS.

14. The bandgap circuit with adaptive start-up design as claimed in claim 13, wherein the bandgap core further comprises:

a third current MOS, having a source terminal coupled to the power line, and a gate terminal coupled to the gate terminals of the first current MOS and the second current MOS; and a third resistor, coupling a drain terminal of the third current MOS to ground;

wherein a connection terminal between the drain terminal of the third current MOS and the third resistor is coupled to an output terminal of the bandgap circuit that provides the bandgap voltage.

15. The bandgap circuit with adaptive start-up design as claimed in claim 14, wherein the bandgap core further comprises:

a second operational amplifier, having a negative input terminal coupled to the emitter terminal of the first bipolar transistor;

a fourth resistor, coupling a positive input terminal of the second operational amplifier to the ground;

a fourth current MOS, having a source terminal coupled to the power line, a gate terminal coupled to an output terminal of the second operational amplifier, and a drain terminal coupled to the ground through the fourth resistor; and a fifth current MOS, having a source terminal coupled to the power line, a gate terminal coupled to the gate terminal of the fourth current MOS, and a drain terminal coupled to the ground through the third resistor.

16. The bandgap circuit with adaptive start-up design as claimed in claim 15, wherein the power line is biased at 1.5V.

* * * * *